(12) United States Patent
He et al.

(10) Patent No.: US 7,148,513 B2
(45) Date of Patent: *Dec. 12, 2006

(54) BACKLIGHT UNITS FOR LIQUID CRYSTAL DISPLAYS

(75) Inventors: Zhan He, Bedford Hills, NY (US); Sadeg M. Faris, Pleasantvile, NY (US)

(73) Assignee: Reveo, Inc, Elmsford, NY (US)

( * ) Notice: Subject to any disclaimer, the term of this patent is extended or adjusted under 35 U.S.C. 154(b) by 620 days.

This patent is subject to a terminal disclaimer.

(21) Appl. No.: 09/885,742

(22) Filed: Jun. 20, 2001

(65) Prior Publication Data
US 2002/0196385 A1 Dec. 26, 2002

(51) Int. Cl.
*H01L 27/15* (2006.01)
(52) U.S. Cl. .......................... 257/79; 257/88
(58) Field of Classification Search .............. 313/504, 313/506, 110, 112; 349/65; 257/79, 88
See application file for complete search history.

(56) References Cited

U.S. PATENT DOCUMENTS

| 5,096,520 | A | 3/1992 | Faris | |
| 5,394,253 | A | 2/1995 | Kelly | |
| 5,825,444 | A * | 10/1998 | Broer et al. | 349/98 |
| 5,831,375 | A | 11/1998 | Benson | |
| 5,926,239 | A | 7/1999 | Kumar et al. | |
| 5,965,907 | A | 10/1999 | Huang et al. | |
| 6,101,032 | A | 8/2000 | Wortman et al. | |
| 6,188,460 | B1 * | 2/2001 | Faris | 349/176 |
| 6,507,379 | B1 * | 1/2003 | Yokoyama et al. | 349/69 |
| 6,521,359 | B1 * | 2/2003 | Noguchi et al. | 428/690 |
| 6,710,541 | B1 * | 3/2004 | He et al. | 313/504 |
| 2002/0075434 | A1 * | 6/2002 | Jiang et al. | 349/129 |

* cited by examiner

*Primary Examiner*—Long Pham

(57) ABSTRACT

A novel backlight is provided for a liquid crystal display (LCD). The backlight of this invention includes an organic electroluminescent (EOL) device and a cholesteric liquid crystal (CLC) polarizing device. This invention is also an LCD. The backlight of the present invention provides for highly efficiency and bright LCDs. This invention further provides for the production of ultra-thin and lightweight LCDs.

31 Claims, 10 Drawing Sheets

BACKLIGHT UNITS FOR LIQUID CRYSTAL DISPLAYS

BACKGROUND OF THE INVENTION (1) Field of the Invention

The present invention relates to liquid crystal display devices. This invention more specifically relates to novel backlight technology for liquid crystal display devices.

(2) Background Information

The importance of electronic displays has increased substantially in recent years with the proliferation of computer technology. Many industry analysts foresee the day when wall-size flat panel displays (FPDs) will be common features in offices, homes and movie theaters. Towards that end, worldwide sales of FPDs, which are already substantial, are expected to increase by a factor of four between calendar years 2001 and 2006 to approximately $55 billion.

Currently, liquid crystal displays (LCDs) are the FPD technology of choice for most applications. Further, LCDs are considered to be the most promising technology for meeting the demands of future FPD applications. However, there remain several technical barriers that limit the development and use of LCDs. One significant technical barrier is the low light efficiency of the conventional LCD. The light efficiency of a typical, conventional LCD panel is only about 3–4%. As a result, the typical LCD has a low display brightness, high energy consumption, and weighs more than desired for most applications. These limitations are particularly noteworthy in laptop computers, which is a major application for LCDs. Three important factors that reduce LCD light efficiency are:

Color filter loss: Most conventional LCD panels utilize white light backlight units. Red (R), green (G), and blue (B) color filters are utilized to achieve full-color image displays. A schematic of the basic structure of a conventional LCD panel 50 is shown in FIG. 1. A color filter 3 is shown adjacent to the backlight 1 side of a liquid crystal cell 4. (Alternatively, color filter 3 may also be positioned on the other side of the liquid crystal cell 4, e.g., adjacent the clear substrate 5 on the user-side of the cell 4.) In this typical example, color filter 3 is of the absorptive type, i.e. it transmits one of the primary colors but absorbs the other two. The theoretical maximum transmittance of this type of color filter 3 is about 33%. In practice a typical absorptive type color filter 3 has a transmittance of about 30%. Therefore, in a conventional LCD, about 70% of the incident light energy is absorbed in the color filter 3.

Polarizer loss: A linear polarizer 2 used in LCD panel 50 is also of the absorptive type. Light of the desired polarization orientation is transmitted, while that which is orthogonal to the desired polarization direction is absorbed. The theoretical transmittance of an absorptive type linear polarizer is 50% for incident light with a random polarization state. In practice, the transmittance of a linear polarizer is approximately 45%. Therefore, approximately 55% of the light incident on the linear polarizer 2 is absorbed.

Backlight unit loss. Conventional backlight units in LCD devices are typically composed of edge light lamps 1A and light guiding pipes 1B, as shown in FIG. 1. The purpose of the light pipes 1B is to guide light from the edge lamps 1A, which are located at the edge of the backlight units 1, towards the center of the LCD panel. Typically, about 44% of the light produced by the edge lamps 1A is lost in the light pipes 1B. Further, in order to achieve a uniform backlight distribution, a highly complicated structure of diffusing elements is necessary. Further still, the edge lamps 1A require a high voltage to produce an adequate supply of light. As a result the power consumption of LCD panels is relatively high.

The total loss from the above-mentioned factors is about 92%. Therefore, elimination of these losses would improve the light efficiency of the conventional LCD by greater than a factor of 11. This would likely result in a substantially brighter LCD panel with much lower power requirements (resulting in longer battery life for most portable electronic applications).

Several approaches have been attempted to eliminate the above-mentioned losses. A self-emitting area light source may reduce the losses attributed to the backlight units. In order to eliminate color filter loss, a few researchers have disclosed using color organic electroluminescent (OEL) devices or color field emission devices as colored backlight units. One approach (see IBM Technical Disclosure Bulletin, vol. 35, p. 433 1992) proposed using screening techniques to lay down strips of red, green and blue organic electroluminescent (OEL) materials so that the three strips emit individual red, green and blue color. Via sequential switching of the colors, the authors were able to achieve sequential LCD modes. Huang, et al., in U.S. Pat. No. 5,965,907, proposed stacking red, green and blue OEL panels to produce a pixilated color backlight unit. However, the fabrication cost of this unit would tend to be high and color cross talk could possibly occur due to the thick stack configuration. Kumar et al., in U.S. Pat. No. 5,926,239, proposed a colored backlight unit utilizing colored phosphors activated by a field emission device. While the above approaches may reduce color filter loss, they introduce significant difficulties into the manufacturing process. Further, they do nothing to eliminate polarizer losses.

One approach for minimizing polarizer losses is to utilize polarization converters based on integrated polarizing beam splitters (see U.S. Pat. Nos. 5,096,520 and 5,394,253). An advantage of polarizing beam splitters is that they may be used with any type of light source, including those used in conventional LCD backlight units or OEL devices. However, such polarizing beam splitter sheets tend to be bulky and heavy, resulting in application difficulties for most LCD configurations. An alternative approach is to use multiple polymer dielectric layer (MPDL) based polarizers. MPDL based polarizers are constructed of multiple birefringent layers and are designed to reflect the desired polarization and transmit the remainder. Both Benson, in U.S. Pat. No. 5,831,375, and Wortman et al., in U.S. Pat. No. 6,101,032, disclose polarized light sources that utilize MPDL polarizing films. U.S. Pat. Nos. 5,831,375 and 6,101,032 are fully incorporated herein by reference. While a polarized light backlight unit for an LCD may conceivably be made using this technology, it is expected that manufacturing difficulties would be encountered because precise control of the thickness and birefringence value is required for each layer. The necessity of producing a pixilated color polarizer with high spatial resolution would only exacerbate potential manufacturing difficulties.

It is clear that upon review of the prior art, there is no current technology for producing an efficient, colored, polarized backlight unit for an LCD.

SUMMARY OF THE INVENTION

One aspect of the present invention includes a backlight unit. The backlight unit of this embodiment includes a light emitting organic electroluminescent (OEL) device and a cholesteric liquid crystal (CLC) polarizing device. An optional variation of this aspect includes an LCD that includes the above described backlight unit.

In another variation of the invention, the backlight unit generates polarized, pixilated, red, green and blue area backlight for a liquid crystal display. This aspect may provide substantial improvements in light efficiency over conventional backlight units. The theoretical maximum light efficiency for this invention is 100%. The backlight unit of this invention may enable high brightness, low power consuming liquid crystal displays to be developed. This invention may further provide for substantial improvement in battery life for electronic devices configured with LCDs. The present invention may provide further still for lightweight, low cost LCDs and for the development of ultra-thin LCDs.

Another aspect of the present invention includes a backlight unit for an LCD comprising (i) an OEL device that includes a cathode layer, an OEL material layer, and an anode layer and (ii) a CLC polarizing device. The backlight unit of this aspect may further include a diffuser element between the anode substrate and the CLC polarizing device, and a quarter-wave plate on the exit side of the CLC polarizing device.

Another aspect of the present invention includes a backlight unit for an LCD comprising (i) an OEL device as described in the previous aspect, (ii) a CLC polarizing device, and (iii) a microcavity for producing microcavity resonance. This aspect may further include a pixilated birefringent retarder layer, positioned within the microcavity, wherein the birefringence values of the individual pixels are tuned to set the microcavity length such that microcavity resonance occurs at the desired wavelengths (e.g. red, green, and blue). Further aspects of the invention include an LCD that includes the above-described backlight units.

DETAILED DESCRIPTION

Figure 1:
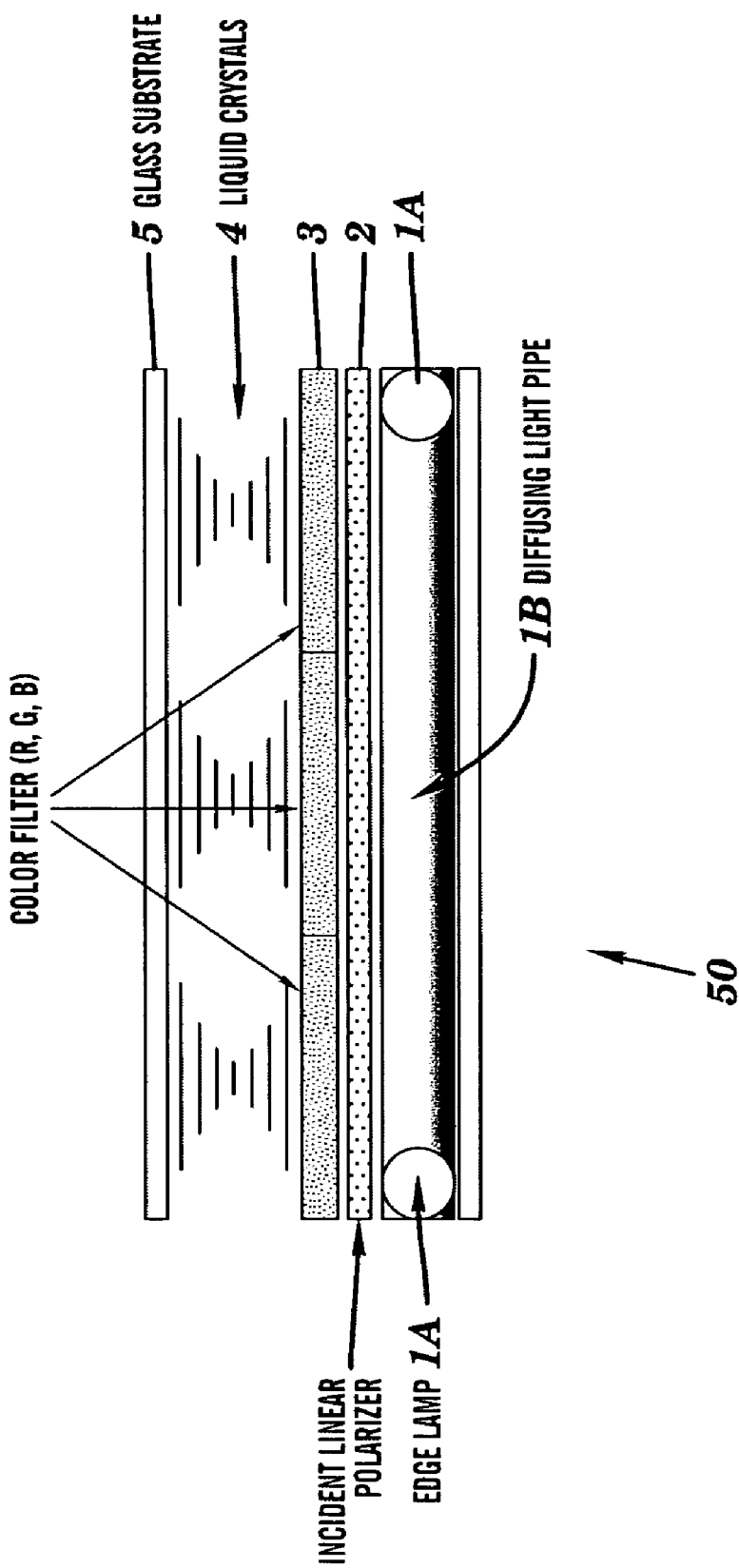
FIG. 1 is a schematic elevational view of the basic structure of a liquid crystal display panel of the prior art.

In various embodiments of the present invention, a backlight unit includes an OEL (Organic Electroluminescent) device and a CLC (Cholesteric Liquid Crystal) polarizing device. The use of an OEL device as the light source may provide several advantages, such as relatively high luminescent efficiency, low driving voltage, low electrical power consumption, long lifetime and simple device fabrication. A further advantage of an OEL device is that a light recycling mechanism may be developed between a mirror-like metal cathode of the OEL device and the CLC polarizing device, which may significantly improve light efficiency. The backlight unit of this embodiment of the present invention may include substantially any type of OEL device, which may further include materials of any type.

As used and taught herein, the use of a CLC polarizing device may provide further advantages in that it is non-absorptive and may be easily pixilated. The use of CLC polarizing technology as taught and/or incorporated by reference herein may be still further advantageous in that it is based on thin film technology, which may enable the development of ultra-thin, lightweight liquid crystal displays. Jiang et al., (in U.S. patent application Ser. No. 09/313,124) discuss CLC polarizing layers and their fabrication in greater detail. The Jiang patent application is fully incorporated herein by reference. As utilized herein, CLC polarizing layers include a plurality of birefringent films disposed on one another. For the purposes of this disclosure, the following terms and definitions are used throughout. A CLC polarizing layer includes a stack, (i.e., a plurality) of birefringent films that perform a predetermined optical polarizing function, for example, reflecting right-hand circularly polarized light across a spectrum of wavelengths. A CLC polarizing device is a device that performs a predetermined optical polarizing function and includes one or more CLC polarizing layers. As used herein, the term 'broadband' refers to a frequency range that includes multiple frequencies/wavelengths, such as those including at least three primary colors of light, (or all of the colors) within the spectrum of visible light. The term 'narrowband' includes a subset of the broadband frequency range, such as the frequencies/wavelengths of one or more colors of light within the visible spectrum.

Prior to discussing the structure and function of the embodiments of this invention in greater detail, a brief discussion of the polarization characteristics of CLC polarizing layers is in order. The CLC polarizing layers utilized in this embodiment of the present invention reflect either right-hand or left-hand circularly polarized light in a predetermined range of wavelengths. Substantially all other light is transmitted. For example one CLC layer may reflect RH light in the red portion of the visible spectrum. Light at other wavelengths, whether LH or RH, is transmitted. The polarizing reflection bandwidth and position of the CLC polarizing layers depends on the molecular pitch distribution profile of the cholesteric liquid crystals (Li, et al., U.S. Pat. No. 5,691,789 and Li, et al., SID '96 Digest, p. 111 (1996)). The Li et al., U.S. patent and article are herein incorporated by reference. Both the bandwidth and the center wavelength of a CLC polarizing device may be tuned over a wide wavelength range. The bandwidth may extend a few dozen to several thousand nanometers.

Figure 2:
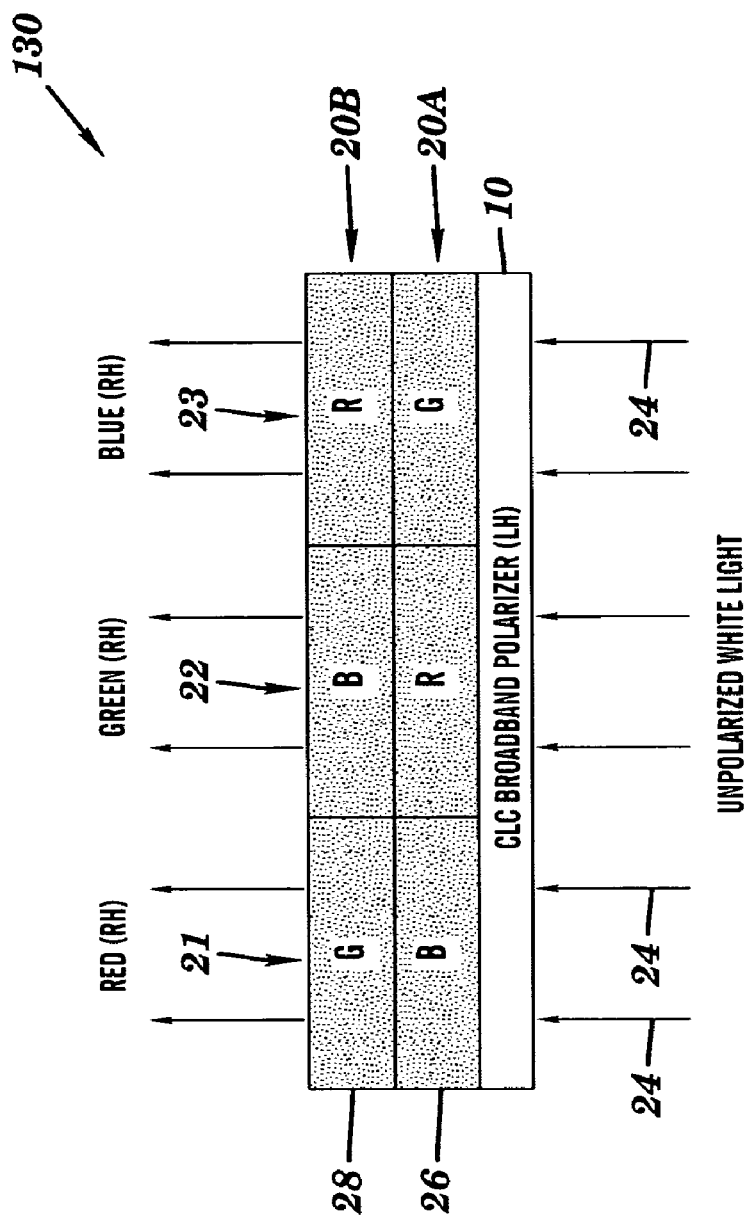
FIG. 2 is a schematic elevational view of a cholesteric liquid crystal polarizing device used in one embodiment of the present invention.

Referring to FIG. 2, in one embodiment of the present invention, a CLC polarizing device 130 includes three CLC polarizing layers; a broadband CLC polarizing layer 10 that reflects LH light and two narrowband, pixilated CLC polarizing layers 20A, 20B that reflect RH light. The pixilated CLC polarizing layers are easily prepared by well-known techniques of controlling the UV light intensity and the exposure time and temperature during curing of UV-curable CLC materials. Pixel elements 21, 22, and 23 transmit RH light in the red, green and blue color range, respectively. For clarity, only the function of pixel 21 is discussed, with the understanding that such discussion similarly applies to the remaining pixels.

Unpolarized (also referred to as randomly polarized) white light 24 is incident on the CLC polarizing device 130. The broadband CLC polarizing layer 10 transmits the RH portion and reflects the LH portion of the incident light back towards the light source at substantially all wavelengths in the visible spectrum. In this exemplary embodiment, the layer 20A portion 26 of pixel 21 is tuned to reflect the blue portion of the transmitted RH light back towards the light source (not shown). Similarly, the layer 20B portion 28 of pixel 21 is tuned to reflect the green portion of the transmitted RH light back towards the light source. The remainder of the incident light, which is red RH light, is transmitted through this pixel 21. A similar discussion may be applied to pixels 22 and 23, in which their layer 20A and 20B portions are similarly tuned to transmit RH green and RH blue light, respectively, while reflecting other color components of the incident light 24. If the light reflected back towards the light source may be efficiently recycled then there will be little light loss in this CLC polarizing device.

FIG. 2 is but one non-limiting example of many possible configurations for the CLC polarizing device used in the present embodiment. For example, the broadband CLC polarizing layer 10 may be chosen such that it reflects RH light while the two narrowband, pixilated CLC polarizing layers 20A, 20B may be chosen such that they reflect LH light. In such an example the individual pixels of such a CLC polarizing device would transmit red, green and blue LH light, respectively. In other configurations, the stacking sequence of the individual CLC polarizing layers may be changed. For example, the broadband CLC polarizing layer 10 may be sandwiched between the two narrowband, pixilated CLC polarizing layers 20A, 20B, and/or the position of layers 20A and 20B may be reversed. In still other configurations, the spatial arrangement of the pixels in one or both of the narrowband, pixilated CLC polarizing layers 20A, 20B may be changed. For example, layer 20A may be configured with a repeating pattern of red, green, and blue reflecting portions, and layer 20B may be configured with a repeating pattern of green, blue, and red or blue, red, and green reflecting portions. In another example, the pixel arrangement in layer 20A may be repeating green, green and blue, and the pixel arrangement in layer 20B repeating blue, red, and red. Persons with ordinary skill in the art will recognize that these examples are merely exemplary and not intended to be exhaustive. Further still, the ordinarily skilled artisan will recognize that CLC polarizing layers reflecting primary colors other than red, green and blue may be utilized (see Hecht, Optics, $2^{nd}$ Ed., Addison-Wesley Publishing Company, Inc., p. 115 (1987)).

Figure 3:
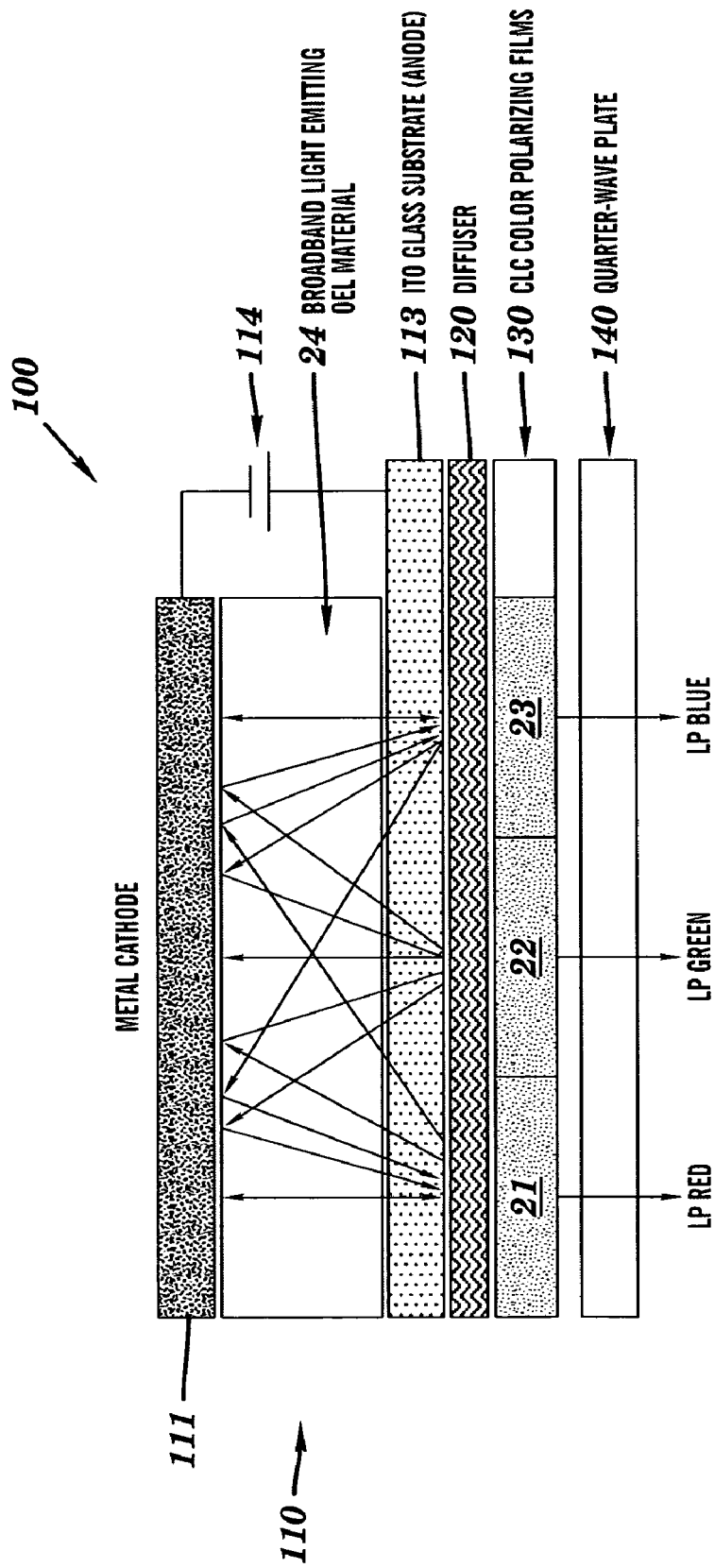
FIG. 3 is a schematic elevational view of an embodiment of a backlight unit of the present invention, shown at an inverted orientation relative to the orientation of FIGS. 1 and 2.

Turning now to FIG. 3, a backlight unit 100 of the present invention is shown. Backlight unit 100 includes an OEL device 110 of substantially any type capable of emitting white light, i.e. a broadband spectrum of light in the visible range. Littman et al., in U.S. Pat. No. 5,405,709, and Kido, in U.S. Pat. No. 5,834,130, disclose exemplary OEL devices of this type. U.S. Pat. Nos. 5,405,709 and 5,834,130 are hereby fully incorporated herein by reference. Backlight unit 100 also includes a CLC polarizing device 130 as discussed hereinabove with respect to FIG. 2. As shown, a DC voltage 114 is applied across the anode 113 and cathode 111 of the OEL device 110 resulting in the emission of unpolarized white light 24. In the particular embodiment shown, only RH red light is transmitted through the red pixel 21 of the CLC polarizing device 130. The LH light is reflected back towards the OEL device 110 by the layer 10 (FIG. 2) of device 130. This LH light is then reflected at the mirror-like metal cathode 111. Upon reflection by cathode 111, the LH light is changed to RH light. The red portion of the reflected RH light will now pass through the CLC polarizing device 130 (after passing through a non-absorptive diffuser 120, discussed hereinbelow) to exit the backlight unit 100. As also shown, a quarter-wave plate 140 may optionally be included at the output side of the CLC polarizing device to convert the circularly polarized light into linearly polarized (LP) light with a predetermined polarization direction.

In a manner similar to that of the red LH light, green and blue RH light are reflected back towards the OEL device 110, i.e., by the narrowband, pixilated CLC polarizing layers 20A, 20B of polarizing device 130. Upon reflection from the metal cathode 111, the green and blue light is LH polarized. This LH polarized light is again reflected back towards the OEL device 110 by the broadband CLC polarizing layer 10 (FIG. 2) of device 130. Upon an additional reflection from the metal cathode 111, the green and blue light is changed to RH light and then passes through the anode substrate 113 (preferably, but not necessarily fabricated from indium tin oxide) and through the non-absorptive diffuser element 120. The diffuser element 120 serves to distribute the green and blue light into the other pixels 22 and 23. For example, the reflected green light from the red pixel 21 reaches the green pixel 22 via scattering at the diffuser element 120. The green pixel 22 and blue pixel 23 in the CLC polarizing device 130 function similarly, with the difference being that they transmit green and blue RH light, respectively.

Figure 4:
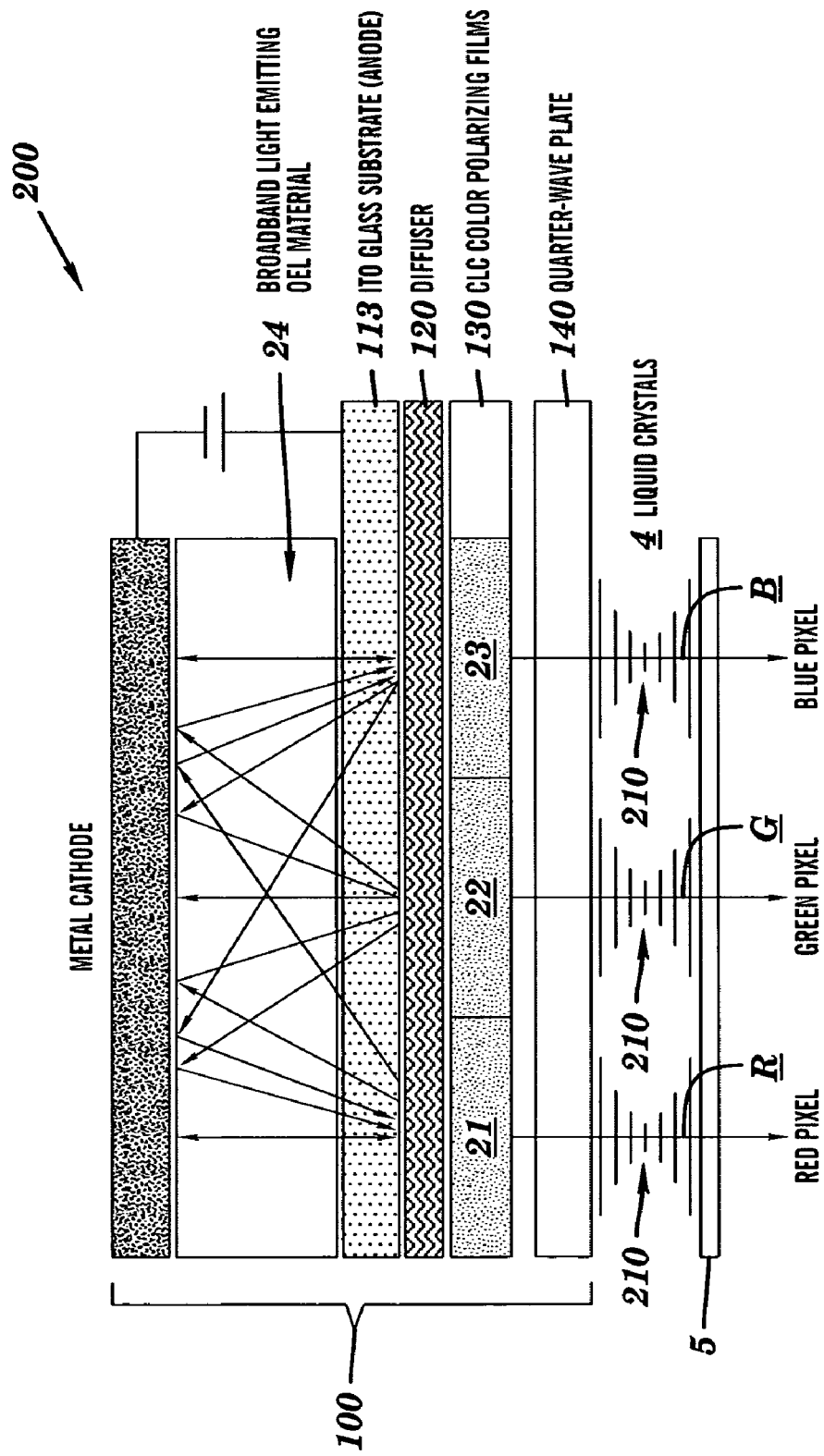
FIG. 4 is a view similar to that of FIG. 3, of a liquid crystal display panel incorporating the backlight unit of FIG. 3.

The above-described embodiment of backlight unit 100 has a theoretical maximum light efficiency of 100%. This backlight unit 100 may be incorporated into an LCD (Liquid Crystal Display) panel 200, such as shown in FIG. 4. Turning now to FIG. 4, the pixels 21, 22, and 23 of backlight unit 100 are axially aligned (i.e., along Red, Green, and Blue light emitting axes R, G, B, respectively) with pixels 210 of conventional liquid crystal cell 4. The backlight unit 100 provides polarized, colored light, so the LCD panel 200 does not require a linear polarizer or a color filter (such as typically used in the prior art). Since the linear polarizers and color filters used in conventional LCD panels are major sources of light loss, the light efficiency, and therefore brightness, of the LCD panel 200 may be substantially greater than that of such conventional LCD panels.

Figure 5:
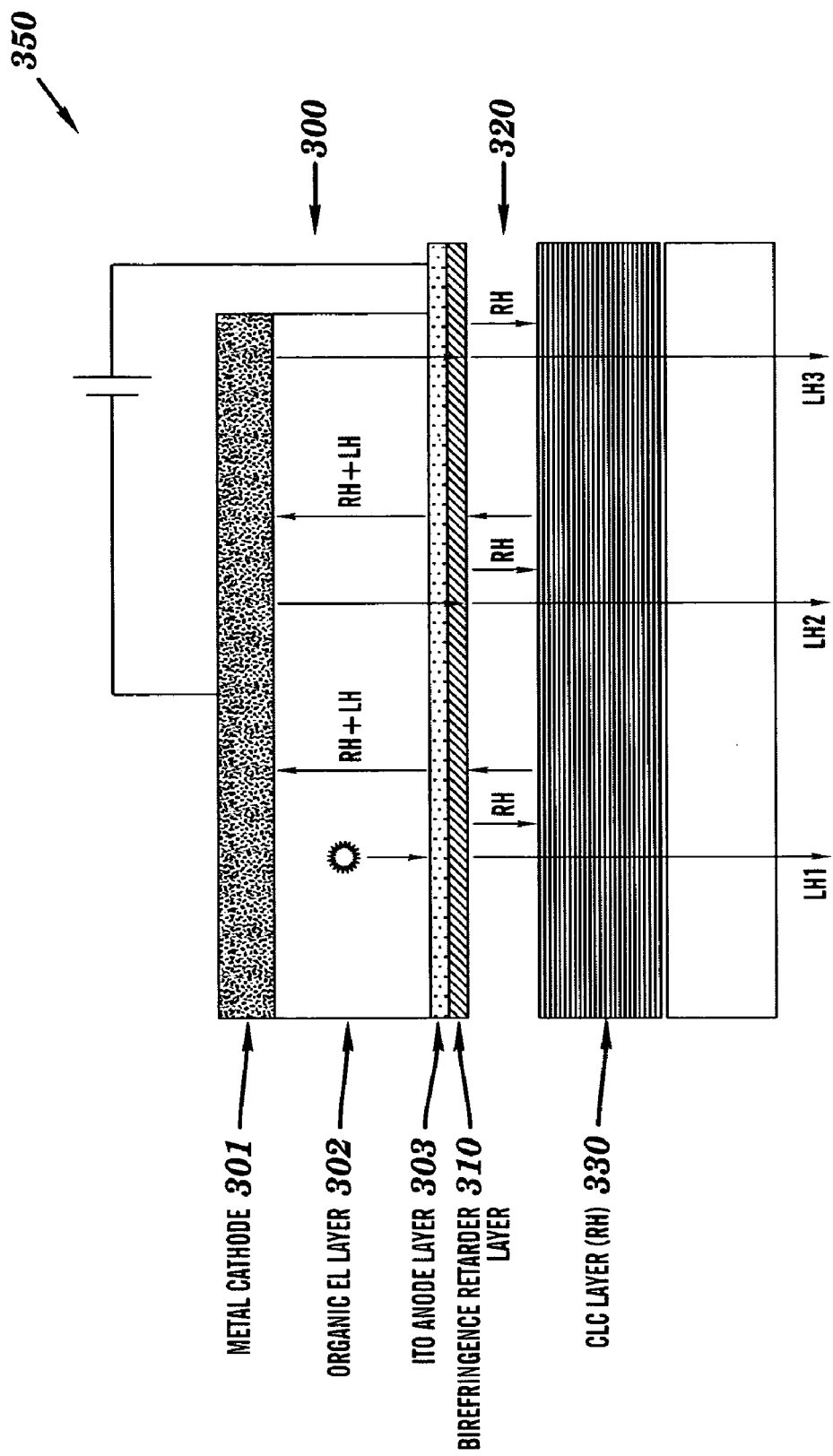
FIG. 5 is a view similar to that of FIG. 3, of another embodiment of a backlight unit of the present invention.

Turning now to FIG. 5, another embodiment of the present invention is shown as backlight unit 350. This embodiment 350 includes an OEL device 300 and a CLC polarizing device 330 to achieve resonant light emission. CLC polarizing device 330 is in many respects similar to device 130 discussed hereinabove, though not necessarily pixilated, as will become apparent from the following description. OEL device 300 may be of substantially any type that is capable of emitting white light. In the embodiment shown, OEL device 300 includes a cathode 301, an OEL material 302, and an anode 303. (Cathode 301 and anode 303 may be similar or identical to cathode 111 and anode 113, respectively, of FIGS. 3 & 4. Moreover, the material used to form cathode 301, material 302, and the anode 303 may be any that are typically used in conventional OEL devices.) A birefringent retarder 310 may further be included, preferably positioned between the anode layer 113 and the CLC polarizing device 330 (i.e., within the microcavity discussed hereinbelow).

In this embodiment, CLC polarizing device 330 effectively functions as a polarizing half-mirror, i.e., by reflecting light of one polarization and transmitting light of the opposite polarization. In order to more easily describe the resonant light emission (also referred to as the microcavity effect), the birefringent retarder 310 and the CLC polarizing device 330 are shown with a separation 320 therebetween. In practice there does not need to be any separation between these two elements. For the purposes of this discussion, it is assumed that the CLC polarizing device 330 reflects RH light and transmits LH light.

Backlight 350 functions as follows. Voltage applied across the cathode and anode 301 and 303 generates emission of unpolarized, white light in the OEL material 302. After passing through birefringent retarder 310, the LH portion of the light is transmitted through the CLC polarizing device 330, labeled LH1, while the RH portion of the light is reflected back towards the retarder 310. The phase lag induced by the retarder 310 may be chosen such that the RH light transmitted back through the retarder 310 emerges therefrom (i.e., at the anode 303) as both LH and RH light. This light then reflects at the surface of the mirror-like metal cathode 301, whereupon the LH light becomes RH and the RH becomes LH owing to the half-wavelength shift upon reflection. Nevertheless, after again passing through the retarder 310, the reflected light still includes both LH and RH light. The LH light is transmitted through CLC polarizing device 330, labeled LH2, and again the remaining RH light reflects back towards OEL device 300. As this process repeats, multiple reflections are established, allowing for multiple interference. Microcavity resonance occurs when this interference is constructive.

In order to achieve microcavity resonance, the microcavity length should be an integer multiple of one half the wavelength of the desired wavelength of resonant light emission. The microcavity length is the optical path-length from the interface of the CLC polarizing device 330 and the birefringent retarder 310 to the mirror like metal cathode 301. Those of ordinary skill in the art will recognize that microcavity length is dependent both the geometric path-length (i.e., the physical distance between these points) and the index of refraction of the materials in the microcavity.

Figure 6:
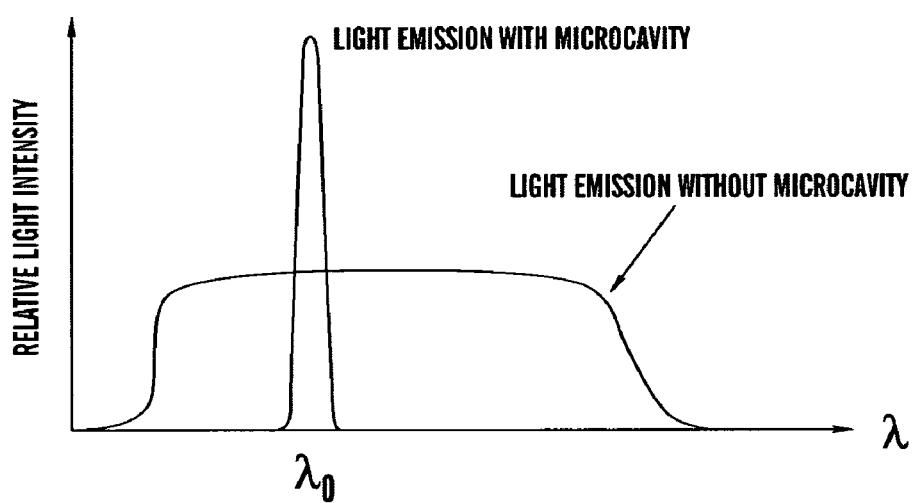
FIG. 6 is a graphical representation of emission spectra of organic electroluminescent devices of the prior art, with and without the microcavity effect.

Those of ordinary skill in the art will further recognize that a microcavity structure inherently has a narrowband emission spectrum, allowing emission nominally only at the resonance wavelength(s) of the microcavity. As described by Gruner et al., in J. Appl. Phys., 80, 207 (1996), a microcavity enhances the emission at the resonant wavelength compared to the free-space emission of the luminescent material and suppresses emission at other wavelengths. This is illustrated in FIG. 6. Further discussion of the microcavity effect is given by Nakayama, et al., in Applied Physics Letters, vol. 63, p. 594 (1993), and Rothberg et al., in SID 95 Digest p. 717 (1995). The Gruner et al., Nakayama, et al., and Rothberg et al., articles are fully incorporated herein by reference.

Therefore, a narrow light emission can be obtained at the resonant wavelength determined by the microcavity optical pathlength and reflection band of CLC polarizing device 330. The center wavelength may be tuned by changing the microcavity length and the reflection band of the CLC polarizing device 330 to achieve different color emissions. As shown and described, the backlight 350 of this embodiment produces narrowband, LH light. Similarly, a CLC polarizing layer 330 that transmits RH light may be used to form a backlight device that produces RH light.

Figure 7:
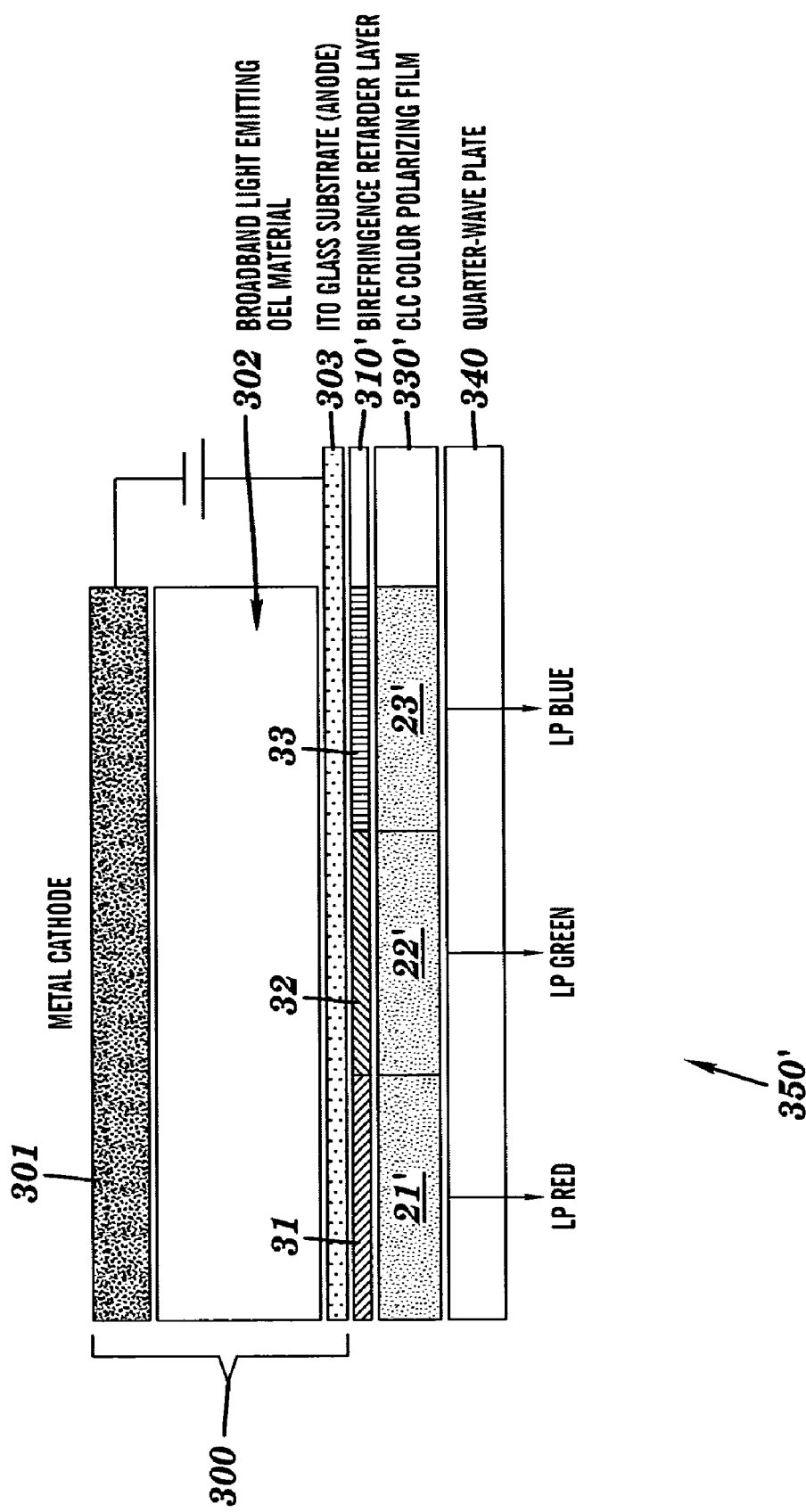
FIG. 7 is a view similar to that of FIG. 5, of a variation of the backlight unit of FIG. 5.
Figure 8:
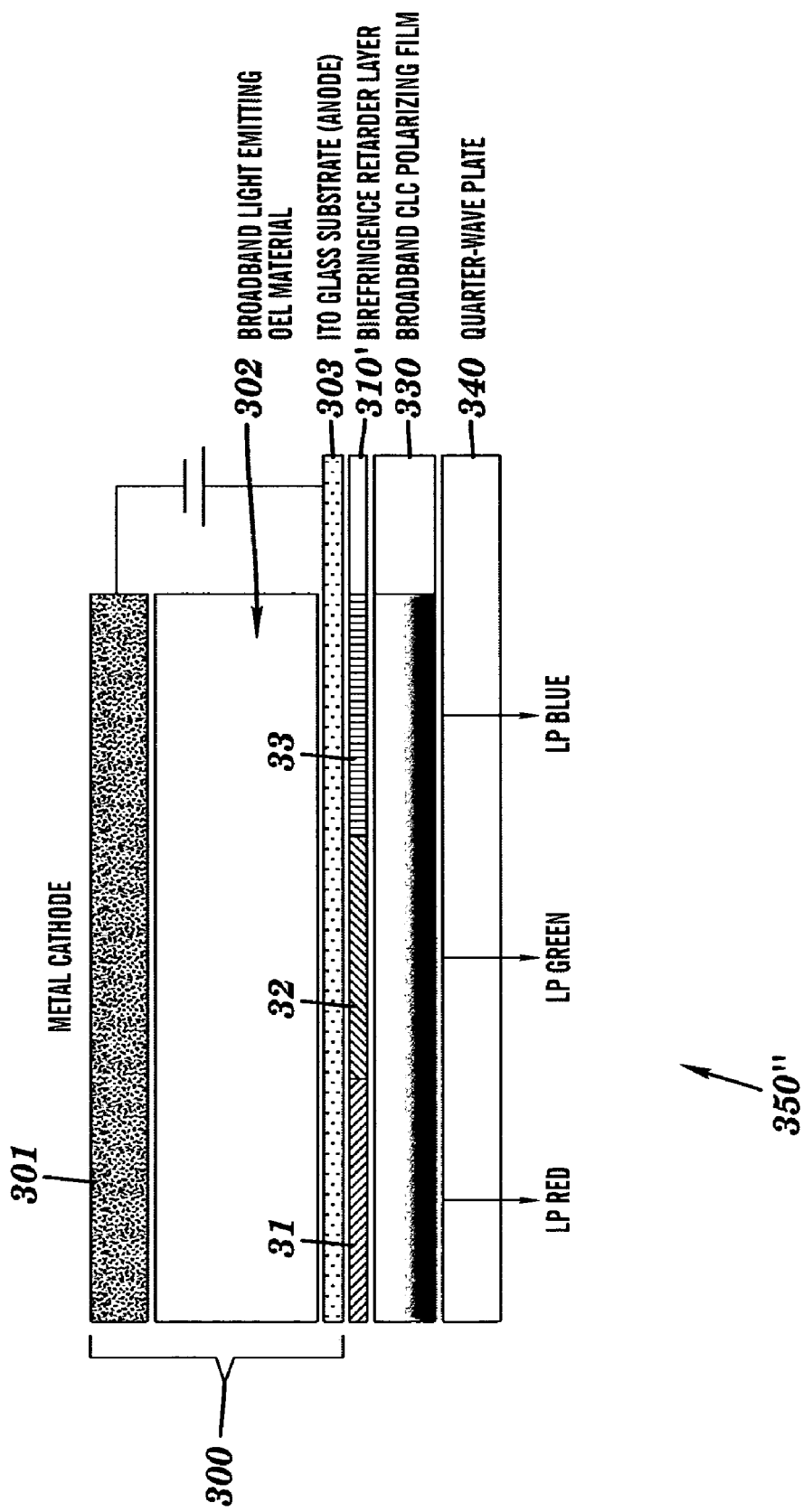
FIG. 8 is a view similar to that of FIG. 7, of another variation of the backlight unit of FIG. 5.

Referring now to FIGS. 7 and 8, based on the previous discussion, at least two variations of backlight 350 may be fabricated, such as shown as backlights 350' and 350". Both backlights 350' and 350" include OEL device 300, and a CLC polarizing device 330', 330". Birefringent retarder 310' may further be disposed within the microcavity as described hereinabove with respect to FIG. 5.

Turning now to FIG. 7, backlight 350' is described in greater detail. The CLC polarizing device 330' is a pixilated layer in which each pixel shown as 21', 22', and 23', transmits one of the primary colors, red, green or blue, respectively, of a desired polarization state. Each pixel, therefore, acts a polarizing half-mirror for one primary color. CLC polarizing device 330' of this type may be fabricated using conventional UV curable CLC materials, by controlling the UV light intensity and the exposure time and temperature during curing. If the birefringent retarder 310' is uniform it is preferred that the birefringence value is selected such that the resonant wavelengths are determined by the narrow band pixilated CLC polarizing device 330'. The birefringent retarder 310' may also be pixilated, with pixels 31, 32, and 33 superposed in axial alignment with pixels 21, 22', and 23'. These retarder pixels 31, 32, and 33 have two functions. The first is to convert a portion of the reflected light (for example, RH light for the purposes of our discussion) into LH light as described in detail hereinabove. The second is to adjust the microcavity length such that it promotes microcavity resonance at the desired wavelength. Those of ordinary skill in the art will recognize that this is easily accomplished by tuning the index of refraction for the polarization state of interest (i.e. tuning the birefringence of the retarder film 310'). Examples of materials suitable for use as retarder 310' include UV curable nematic LC materials. Exposure of these materials to UV radiation typically reduces the birefringence value.

As seen in light of the foregoing discussion, each pixel 21', 22', 23' produces circularly polarized light (all either LH or RH) of one primary color. After passing through quarter-wave plate 340 at the exit side of the backlight 350', the colored, circularly polarized light is converted into colored, linearly polarized light.

As shown in FIG. 8, backlight 350" is substantially similar to that of backlight 350', with the exception that broadband CLC polarizing device 330 (rather than the pixilated device 330') is utilized as the polarizing half-mirror. As described hereinabove, the broadband CLC polarizing device 330 functions as a polarizing half-mirror over the visible range of wavelengths and is easily fabricated such as by controlling the UV light intensity and the exposure time and temperature during curing of UV curable CLC materials. The retarder layer 310' is pixilated as described hereinabove. As with backlight 350', each pixel 31, 32, 33 produces circularly polarized light (either LH or RH) of one primary color. As it passes through quarter-wave plate 340 at the exit side of the backlight 350", the colored, circularly polarized light is converted into colored, linearly polarized light.

Figure 9:
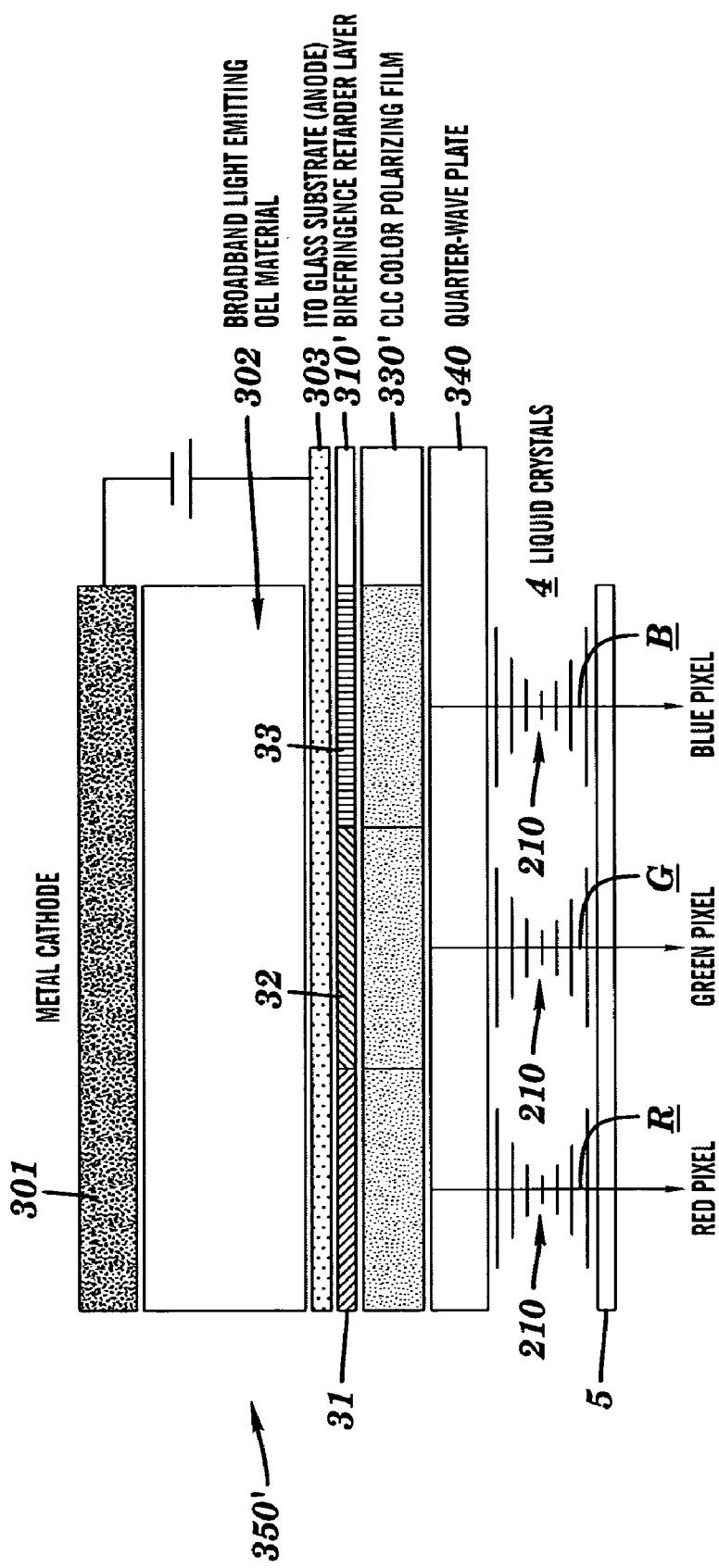
FIG. 9 is a view similar to that of FIG. 3, of a liquid crystal display panel incorporating the backlight unit of FIG. 7.
Figure 10:
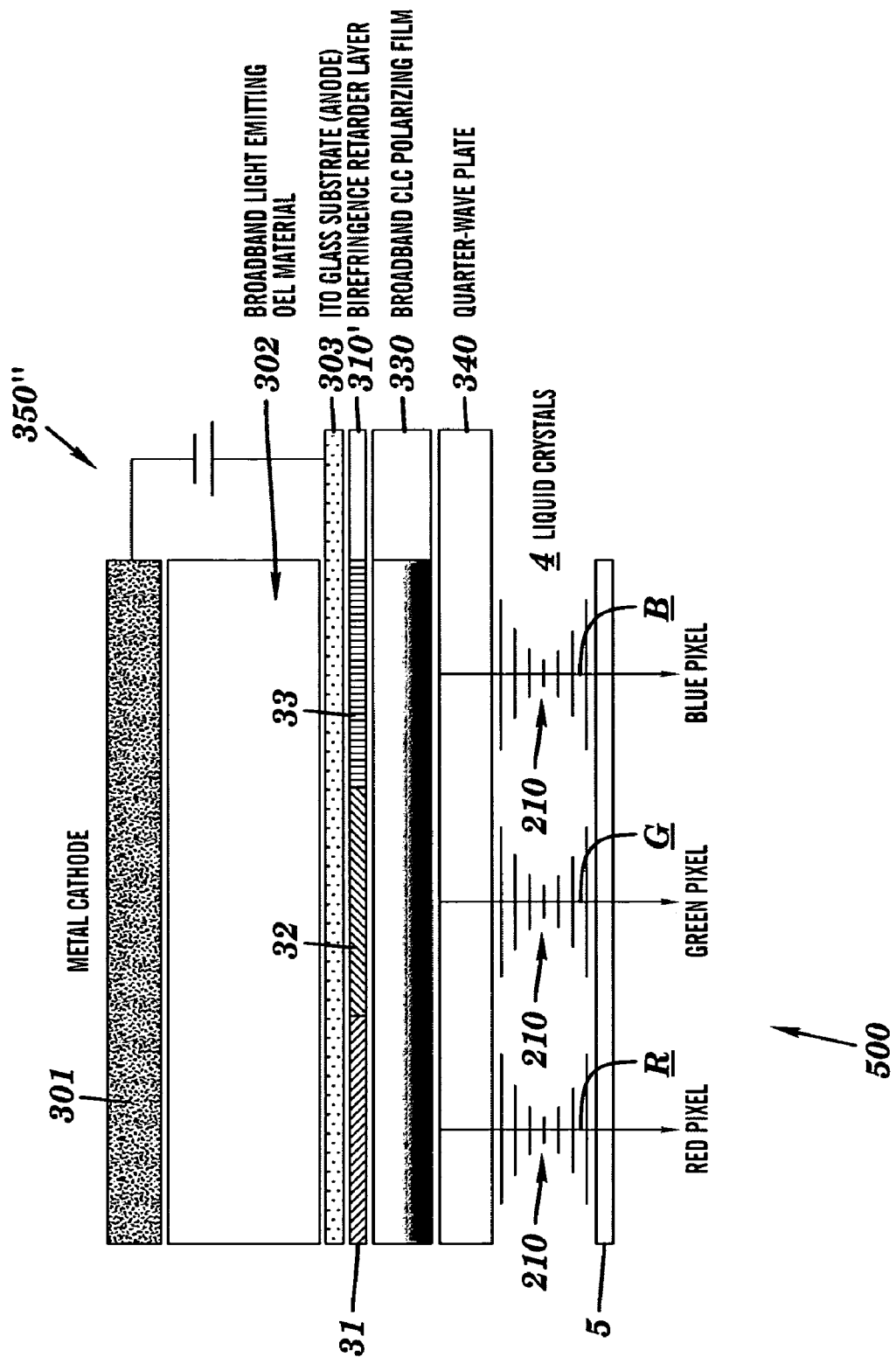
FIG. 10 is a view similar to that of FIG. 3, of a liquid crystal display panel incorporating the backlight unit of in FIG. 8.

The backlights 350' and 350" of FIGS. 7 and 8 may be utilized to produce LCD panels 400 and 500, as shown in FIGS. 9 and 10. As shown, the pixels 31, 32, 33, of the backlight units 350', 350" are axially aligned (along axes R, G, and B with the pixels 210 of liquid crystal cell 4 as shown. The backlight units 350', 350", and therefore the LCD panels 400 and 500, of this embodiment provide high purity colors (i.e., narrow bandwidth), since the emissions are generated via microcavity resonance. As with the LCD shown in FIG. 4, a linear polarizer and a color filter are not required in these LCD panels 400, 500 since the backlight units 350', 350" provide colored and polarized light. Moreover, wide-angle viewing may be improved through the use of diffuser elements 120, since the output light from the backlights 350', 350" tends to be highly directional.

What we claim is:

1. A backlight for a liquid crystal display comprising:
    an organic electroluminescent device;
    a cholesteric liquid crystal polarizing device; and
    a microcavity from which microcavity resonance may be achieved, wherein said microcavity has a characteristic microcavity length.

2. The backlight of claim 1, further comprising a light recycling mechanism such that the theoretical maximum light efficiency of said backlight unit is about 100%.

3. A liquid crystal display comprising a backlight device as described in claim 1.

4. The backlight of claim 1 wherein said organic electroluminescent device comprises an organic electroluminescent material layer superposed between a cathode and an anode layer.

5. The backlight of claim 4 wherein said cathode is a metal and said anode layer is indium tin oxide.

6. The backlight of claim 4; wherein said cathode and said anode layer are connected to a power supply.

7. The backlight of claim 1 wherein said cholesteric liquid crystal polarizing device is a broadband polarizing device.

8. The backlight of claim 1 wherein said cholesteric liquid crystal polarizing device is a narrowband polarizing device.

9. The backlight of claim 1, wherein said cholesteric liquid crystal polarizing device includes a plurality of pixel regions.

10. The backlight of claim 9, said pixel regions being arranged in a repeating array of red pixels, green pixels and blue pixels, said red pixels reflecting circularly polarized red light, said green pixels reflecting circularly polarized green light and said blue pixels reflecting circularly polarized blue light.

11. The backlight of claim 9, said pixel regions being arranged in a repeating array of red pixels, green pixels and blue pixels, said red pixels transmitting circularly polarized red light, said green pixels transmitting circularly polarized green light, and said blue pixels transmitting circularly polarized blue light.

12. The backlight of claim 11, wherein said cholesteric liquid crystal polarizing device comprises multiple cholesteric liquid crystal polarizing layers.

13. The backlight of claim 12, wherein said cholesteric liquid crystal polarizing device comprises three cholesteric liquid crystal polarizing layers; a first layer, a second layer and a third layer.

14. The backlight of claim 13, wherein said first layer is a broadband cholesteric liquid crystal polarizing layer and said second layer and said third layer are narrowband cholesteric liquid crystal polarizing layers.

15. The backlight of claim 14, wherein said second layer and said third layer each include a plurality of pixel regions.

16. The backlight of claim 11, said backlight further comprising a diffuser element.

17. The backlight of claim 16, wherein said diffuser element is disposed between said anode layer and said cholesteric liquid crystal polarizing device.

18. The backlight of claim 11, said backlight further comprising a quarter-wave retarder, said quarter-wave retarder being disposed on the output side of said cholesteric liquid crystal polarizing device.

19. The backlight of claim 1, further comprising a birefringent retarder layer, said birefringent retarder layer being disposed within said microcavity.

20. The backlight of claim 19, wherein said microcavity length is the optical pathlength from said cathode, through said organic electroluminescent material, said anode layer and said birefringent retarder layer to said cholesteric liquid crystal polarizing device.

21. The backlight of claim 19, wherein said birefringent retarder includes a plurality of pixel regions.

22. The backlight of claim 21, wherein the plurality of pixel regions include a first pixel region, a second pixel region, and a third pixel region, each having a mutually distinct birefringence values, being arranged in a repeating array, said birefringence value of said first pixel region being such that red emission from said microcavity is achieved, said birefringence value of said second pixel region being such that green emission from said microcavity is achieved, said birefringence value of said third pixel region being such that blue emission from said microcavity is achieved.

23. The backlight of claim 21, wherein said plurality of pixel regions includes a repeating array of red pixels, green pixels and blue pixels, said red pixels reflecting circularly polarized red light, said green pixels reflecting circularly polarized green light and said blue pixels reflecting circularly polarized blue light.

24. The backlight of claim 21, wherein said cholesteric liquid crystal device is a broadband polarizing device.

25. The backlight of claim 23 further comprising a quarter-wave plate, said quarter-wave plate being superposed on the output side of said cholesteric liquid crystal polarizing device.

26. The backlight of claim 24 further comprising a quarter-wave plate, said quarter-wave plate being superposed on the output side of said cholesteric liquid crystal polarizing device.

27. A backlight for a liquid crystal display comprising:
    an organic electroluminescent device which includes a cathode superposed with an organic electroluminescent material, which is superposed with an anode layer;
    a cholesteric liquid crystal polarizing device to selectively transmit and reflect circularly polarized light;
    a microcavity from which microcavity resonance may be achieved, wherein said microcavity has a characteristic microcavity length
    a diffuser element, said diffuser element being disposed between said anode layer and said cholesteric liquid crystal polarizing device;
    a quarter-wave retarder, said quarter-wave retarder being disposed on an output side of said cholesteric liquid crystal polarizing device; and
    a plurality of pixel regions arranged in a repeating array of red pixels, green pixels and blue pixels, said red pixels adapted to transmit red light, said green pixels adapted to transmit green light, and said blue pixels adapted to transmit blue light.

28. The backlight of claim 27, wherein the plurality of pixel regions are disposed within said cholesteric liquid crystal polarizing device, said pixel regions being arranged in a repeating array of red pixels, green pixels and blue pixels, said red pixels transmitting circularly polarized red light, said green pixels transmitting circularly polarized green light, and said blue pixels transmitting circularly polarized blue light.

29. The backlight of claim 27, wherein the plurality of pixel regions are disposed within said retarder layer.

30. A liquid crystal display comprising a backlight as described in claim 27.

31. A backlight for a liquid crystal display comprising:
an organic electroluminescent means; and
a cholesteric liquid crystal polarizing means; and
a microcavity from which microcavity resonance may be achieved, wherein said microcavity has a characteristic microcavity length.

* * * * *